US009378624B1

(12) United States Patent
Loda et al.

(10) Patent No.: US 9,378,624 B1
(45) Date of Patent: Jun. 28, 2016

(54) VARIETY CARD GAME AND METHOD OF PLAY

(71) Applicants: Michael A. Loda, Bartlett, IL (US); John R. Loda, Bartlett, IL (US)

(72) Inventors: Michael A. Loda, Bartlett, IL (US); John R. Loda, Bartlett, IL (US)

(*) Notice: Subject to any disclaimer, the term of this patent is extended or adjusted under 35 U.S.C. 154(b) by 198 days.

(21) Appl. No.: 14/187,517

(22) Filed: Feb. 24, 2014

(51) Int. Cl.
*A63F 13/822* (2014.01)
*G07F 17/32* (2006.01)
*A63F 1/00* (2006.01)

(52) U.S. Cl.
CPC .............. *G07F 17/3293* (2013.01); *A63F 1/00* (2013.01)

(58) Field of Classification Search
USPC ............................................ 463/9, 10, 11, 12
See application file for complete search history.

(56) References Cited

U.S. PATENT DOCUMENTS

2009/0179379 A1* 7/2009 Banke ........................ A63F 1/00 273/292
2010/0261519 A1* 10/2010 Zapata ...................... A63F 1/04 463/22

* cited by examiner

*Primary Examiner* — Paul A D'Agostino
*Assistant Examiner* — Brandon Gray
(74) *Attorney, Agent, or Firm* — Mathew R. P. Perrone, Jr.; Joseph Whang

(57) ABSTRACT

A Variety Card Game involves two or more players, each of whom uses a deck comprised of a plurality of cards, and wherein each player draws, holds, and deploys a series of cards from his or her card deck, and uses these cards to initiate in-game confrontations. Confrontation outcomes are determined according to the cards used by each of the players during game play.

20 Claims, 8 Drawing Sheets

VARIETY CARD GAME AND METHOD OF PLAY

The present invention pertains to a card game, and more particularly, to a card game involving two or more players, each of whom uses a game deck comprised of a plurality of cards. Each card represents different facets of a confrontation or battle. Each player draws, holds, and deploys a series of cards from a card deck, and uses these cards to initiate in-game confrontations. Confrontation outcomes are determined according to the cards used by each of the players during game play.

BACKGROUND OF THE INVENTION

Trading Card Games [TCG] and Collectible Card Games [CCG] have become increasingly popular. These games use a pool of playing cards which can be purchased and traded amongst game players. The pool of playing cards includes a plurality of card species. Each species of playing card has a unique combination of characteristics and abilities which can be strategically implemented during game-play. The plurality of card species are typically categorized into three main functional categories: a) character cards; b) power cards; and c) effect cards.

Conventional game-play for TCG and CCG games involves each player drawing, holding, and deploying a series of cards from his or her card deck, and then using these cards to initiate in-game confrontations. Deployment and use of character cards and effects cards typically requires the use of power cards. Use of a card is usually limited to once-per-turn, and thus the use of a card is often accompanied by physical manipulation of the card to indicate its use. The most common indicators of use are the rotation of the card from a vertical orientation to a horizontal orientation, or moving the card from one game-play zone to a different game-play zone. These methods of indicating use of a card are simple and subtle, and are thus often manipulated by players to cheat or acquire unfair advantages in games. A need exists for more effective ways of indicating use of cards (such as power cards) which are simple and clear, and which prevent cheating and confusion.

In conventional TCG and CCG games, the winner is determined by "life points" or "life pools" for each player. Through in-game confrontations, a player can deplete the life points of an opponent, until that opposing player's life points are fully depleted and the player is removed from the game. These "life points" or "life pools" are discarnate and unembodied numbers. Most TCG and CCG games thus require scoring equipment, such as dice or score-sheets, to track the unembodied life point depletion for each player. The scoring equipment functions only to track life points, and is incidental to the in-game confrontations and overall strategy of the game. Likewise, depletion of life points is a simple matter of addition and subtraction, and requires limited strategic decisions as to how life points will be depleted. A need exists for more effective ways of scoring and score-keeping in TCG and CCG games, including scoring systems which are integrated into the in-game confrontations and overall strategy of the game.

TCG and CCG games are designed around direct player-vs-player confrontations. Gameplay typically involves individual cards of a player being matched against individual cards of an opposing player, with accompanying effect cards enhancing those primary cards. Though joint or team confrontations can exist in these games, the player-vs-player and card-vs-card construct of these games make multi-card and multi-player joint-actions complicated and difficult to implement. These complications are multiplied and magnified as additional teammates or cards are added into the joint confrontation. A need exists for a system of gameplay which is conducive to large numbers of players and cards being used in a joint confrontation.

Most TCG and CCG games use a pool of playing cards which are narrowly designed to implement a specific construct of rules and gameplay. The characteristics and abilities of these cards limit them from application in a broader variety of games. Any integration of different game card collections thus requires complex new rules and complicated gameplay which is not easily facilitated by the characteristics of the cards themselves. A need exists for a Variety Card Game system of playing cards which are tailored to a specific construct of rules and gameplay, but can also be easily combined with a broader range of cards from other Variety Card Games to form a new and unique Variety Card Game construct.

SUMMARY OF THE INVENTION

Among the many objectives of this invention is the provision of a Variety Card Game involving two or more players.

Another objective of this invention is the provision of a Variety Card Game which includes a variety of playing card categories. In one embodiment, the variety of playing card categories includes Life Form cards, Tactical cards, Resource cards, and Fuel cards.

Yet another objective of this invention is the provision of a Variety Card Game which uses a playing surface comprising a variety of card zones. In one embodiment, the variety of playing card zones includes a Hand, a Draw Deck, a Stasis zone, a Battle field zone, a Garrison zone, a Fuel depot zone, and a Research Facility zone.

Still another objective of this invention is the provision of a Variety Card Game which uses a combination of cards from more than one different Variety Card Games to engage in a combined Variety Card Game. In one embodiment, the game includes: a) a first Variety Card Game comprising a pool of playing cards which are designed to implement a first construct of rules and gameplay; and b) a second Variety Card Game comprising a pool of playing cards which are designed to implement a second construct of rules and gameplay; wherein the first Variety Card Game and the second Variety Card Game are played together and integrated into a new third Variety Card Game having a third construct of rules and gameplay.

A further objective of this invention is the provision of a method for playing a Variety Card Game. In one embodiment, each player uses a deck comprised of a plurality of cards, with each card representing different facets of a confrontation or battle. Each player draws, holds, and deploys a series of cards from his or her card deck, and uses these cards to initiate in-game confrontations. Confrontation outcomes are determined according to the cards used by each of the players during game play.

Yet a further objective of this invention is the provision of a method for playing a Variety Card Game which includes various turn-based phases of gameplay. In one embodiment, the turn-based phases of gameplay include a Refuel phase, a Draw phase, a Pre-ops phase, an Assault phase, a Post-ops phase, and an End phase.

Still a further objective of this invention is the provision of a method for playing a Variety Card Game which includes an effective way of indicating the in-play use of game cards (such as fuel cards) which is simple and clear, and which prevents cheating and confusion. In one embodiment, a card used in play can be inverted from a face-up orientation to a face-down orientation. In another embodiment, a card used in play can be rotated from a vertical orientation to a horizontal orientation. In another embodiment, a card used in play can be moved from a first zone of a playing surface (such as a fuel tank zone) to a second zone of the playing surface (such as a depleted fuel zone). In yet another embodiment, a card used in play can be concomitantly inverted, rotated, moved, or any combination thereof.

Yet another further objective of this invention is the provision of a method for playing a Variety Card Game which includes an effective way of scoring and score-keeping which is integrated into the in-game confrontations and overall strategy of the game. In one embodiment, the game comprises a collection of resource cards which function as a player's life points, such that once a player's resource cards are depleted, that player loses the game. In another embodiment, the resource cards have characteristics and abilities which can be strategically implemented during game-play, such that the resource cards function both as a scorekeeping element and a card which can be strategically implemented during game-play.

Still another further objective of this invention is the provision of a method for playing a Variety Card Game which includes an effective way of conducting joint confrontations with multiple cards from a single player, or with single or multiple cards from multiple team-mate players.

Still yet another further objective of this invention is the provision of a method for playing a Variety Card Game which includes playing the game through an electronic media device. In one embodiment, the Variety Card Game is played through a consoled video game system, a computer, a video device, a hand-held video game system, or any related electronic media device. In another embodiment, the Variety Card Game is played through a mobile device, an online network, an internet website, an online discussion forum, or any related electronic media device.

These and other objectives of the invention (which other objectives become clear by consideration of the specification, claims and drawings as a whole) are met by providing a Variety Card Game involving two or more players, each of whom uses a deck comprised of a plurality of cards, and wherein each player draws, holds, and deploys a series of cards from his or her card deck, and uses these cards to initiate in-game confrontations.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
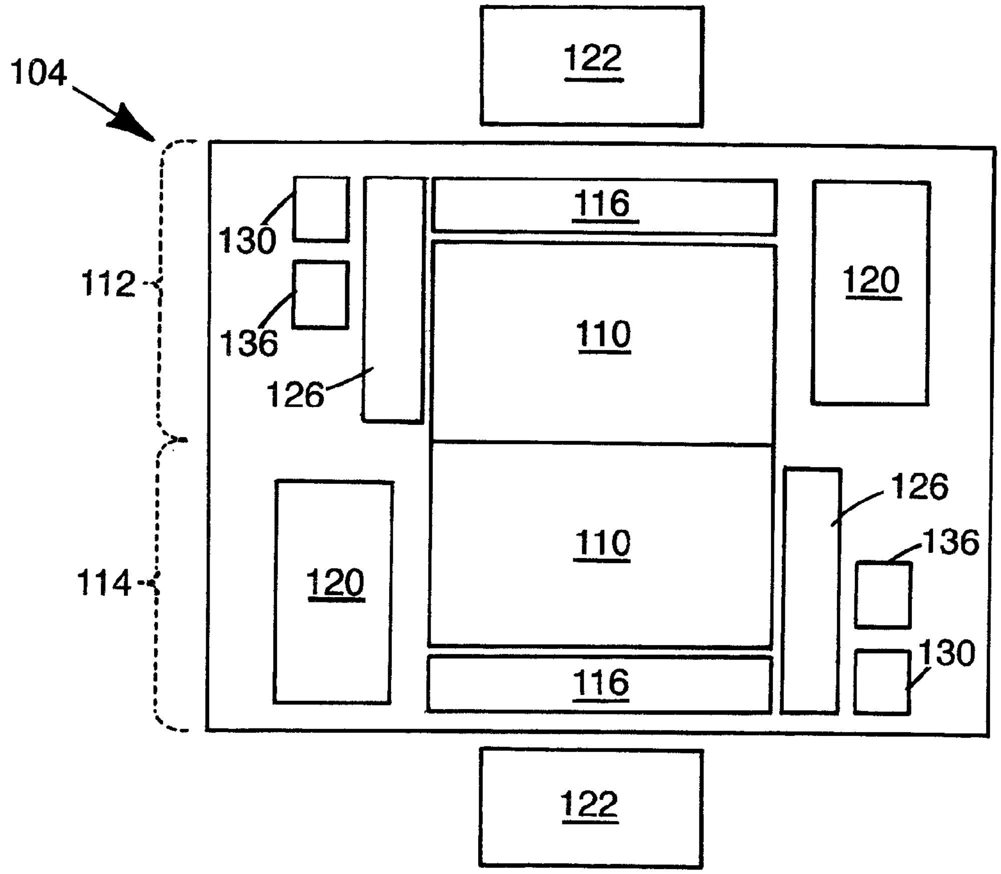
FIG. 1 depicts Basic Board 104 of Game Layout 100.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with his or her inflectional morphemes do not necessarily denote direct or intermediate connections, but may also include connections through mediate elements or devices.

The present invention pertains to a card game for two or more players. Each player uses a deck comprised of a plurality of game cards to battle each other, with the overall goal of depleting all of the player's opponent's resource points. Each card represents different facets of a confrontation or battle. Each player draws, holds, and deploys a series of game cards from his or her game deck, and then uses these cards to initiate in-game confrontations. Confrontation outcomes are determined according to the cards used by each of the players during game play.

In one embodiment of the invention, each player has access to a universal collection of tradable game cards having a playing face on one side. The universal collection of tradable game cards includes a plurality of card species. Each card species has a unique set of characteristics for use in game play. The universal collection of tradable game cards can include multiple copies of a card species. A player acquires tradable game cards from the universal collection to form a personal library of game cards. The player then selects a set number of game cards from the personal library to form a game deck.

The game card species can be categorized into groups having common characteristics or uses. In a preferred embodiment, the universal collection of tradable game cards is categorized into at least four primary card types, including: Life Form Cards, Tactical cards, Fuel Cards, and Resource Cards. Cards within these four or more categories can be further categorized into multiple tiers of group and sub-group categorizations.

Game cards of all categories can have a card effect associated with the game card. Activation of a card effect can allow the player to alter the characteristics of that specific game card, to alter the characteristics of other game cards, or to alter the rules of the game. Information regarding the effects associated with a game card can be set forth in the card effect section of the game card. Card effects can have a fuel cost associated to the effect, or can have no fuel cost. Card effects can be single-use, temporary, or permanent during the game.

Gameplay occurs on a gaming board or surface. The gaming surface can include marked or unmarked player regions for each player. Each player region includes several marked or unmarked gameplay regions which are designated for placement of specific game card categories. The gaming surface can also include gameplay regions for conducting certain phases of the gameplay. In a preferred embodiment, each player region comprises at least seven primary gameplay regions, including: a Hand, a Game Deck region, a Stasis region, a Battle Field region, a Resource Garrison region, a Fuel Depot region, and a Research Facility region. Gameplay regions within these seven or more categories can be further divided into sub-regions.

Gameplay is conducted by each player completing turns until one player has won. Each turn can comprise a series or collection of turn phases. The turn phases allow a player to acquire, deploy, and utilize game cards from that player's game deck. In a preferred embodiment, a player's turn comprises six turn phases, including: a Refuel phase, a Draw phase, a Pre-ops phase, an Assault phase, a Post-ops phase, and an End phase. Turn phases within these six or more phases can be further divided into sub-phases of a turn.

Turning now to the drawings, the layout and gameplay of Game Layout 100 is better understood in view of FIGS. 1-10.

Figure 2:
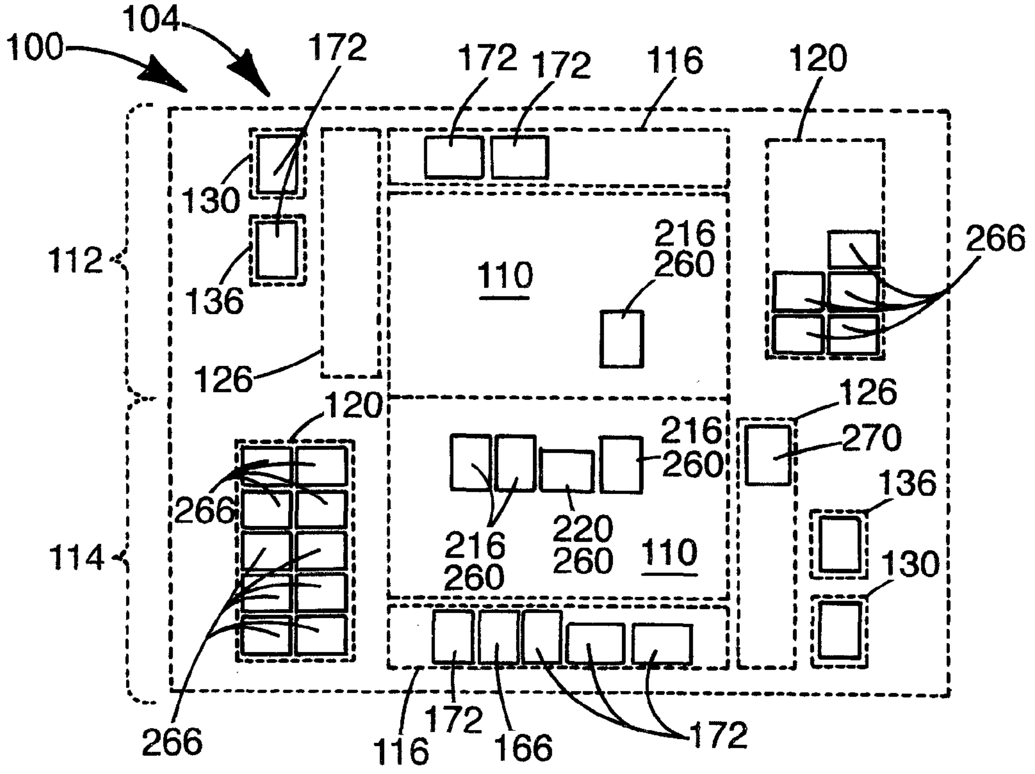
FIG. 2 depicts Game Layout 100 in Play.

FIG. 1 shows basic board 104 as one embodiment of a gaming surface for Game Layout 100. FIG. 2 depicts gameplay regions of basic board 104 being populated by game cards during gameplay.

Basic board 104 of FIG. 1 shows a game board layout for a two-player game comprising a first player and a second player. Game Layout 100 for two players could comprise a basic board 104 comprising a first-player region 112 and a second-player region 114. Player regions 112 and 114 are each divided into several gameplay regions. These gameplay regions include: battle field 110; fuel depot 116; resource garrison 120; research facility 126; game deck 130; stasis 136; and hand 122.

Certain gameplay regions can be designated for the placement of specific game card categories. In one embodiment, battle field 110 is designated for the placement of all life form game cards 260. In another embodiment, fuel depot 116 is designated for the placement of all fuel game cards 172. In yet another embodiment, resource garrison 120 is designated for the placement of all resource game cards 266. In still another embodiment, research facility 126 is designated for the placement of all tactical game cards 270.

Basic board 104 of FIG. 1 shows these gameplay regions in a specific configuration for first-player region 112, and the same configuration being rotated for second-player region 114. However, a gaming surface for a two-player game of Game Layout 100 can include any combination of gameplay regions in any configuration conducive to playing the game. Gaming surfaces for games which include three or more players can also include player regions in configurations conducive to playing larger multiplayer games.

Figure 3:
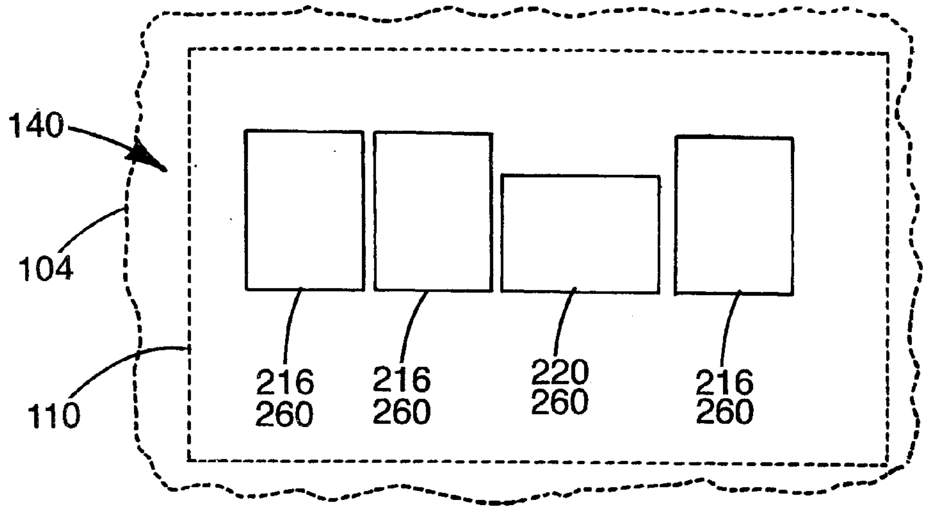
FIG. 3—Depicts Battle Field First Layout 140 of Battle Field 110.
Figure 4:
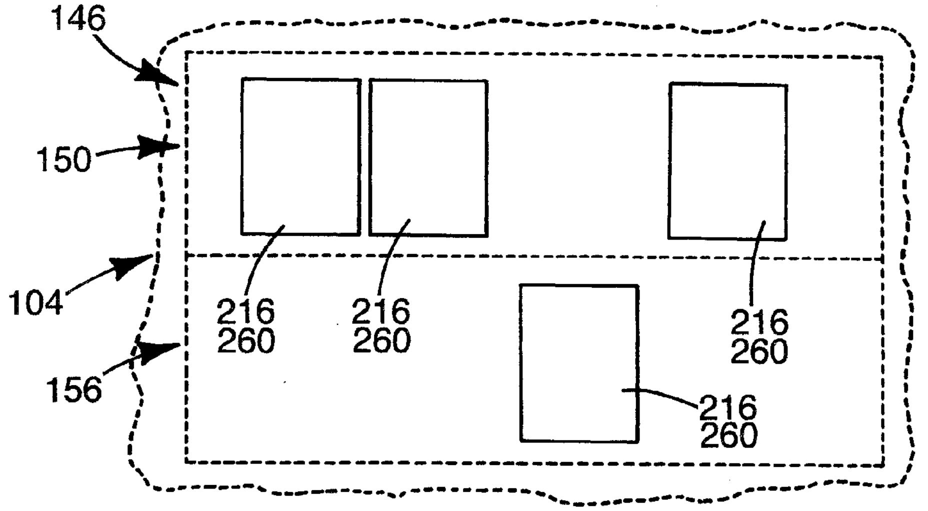
FIG. 4 depicts Battle Field Second Layout 146 of Battle Field 110, including Front Line 150 and Back Line 156 sections.

FIGS. 1 and 2 show basic board 104 to include battle field 110. FIGS. 3 and 4 show a more detailed depiction of the layout of battle field 110 on basic board 104. FIG. 3 depicts battle field first layout 140; and FIG. 4 depicts battle field second layout 146. Battle field first layout 140 and battle field second layout 146 can be used interchangeably as the layout for battle field 110, depending on the preferences of individual players or game rules.

FIG. 3 shows battle field first layout 140 being populated by more than one life form card 260. Life form card 260 is shown in both a vertical position 216 and a horizontal position 220. In one embodiment, placement of life form card 260 in vertical position 216 indicates that the card is in an assault position for the purpose of gameplay. In another embodiment, placement of life form card 260 in horizontal position 220 indicates that the card is in an armored position for the purpose of gameplay. A player can transition life form card 260 from an assault position to an armored position by rotating life form card 260 from vertical position 216 to horizontal position 220, and vice versa.

FIG. 4 shows battle field second layout 146 to include a front line sub-region 150 and back line sub-region 156. Both front line sub-region 150 and back line sub-region 156 are populated by life form card 260 in vertical position 216. In one embodiment, placement of life form card 260 in front line sub-region 150 indicates that the card is in an assault position for the purpose of gameplay. In another embodiment, placement of life form card 260 in back line sub-region 156 indicates that the card is in an armored position for the purpose of gameplay. A player can transition life form card 260 from an assault position to an armored position by transferring life form card 260 from front line sub-region 150 to back line sub-region 156, and vice versa.

Any combination of elements from battle field first layout 140 and battle field second layout 146 can be used for the layout of battle field 110 on basic board 104. In one embodiment, battle field 110 includes front line sub-region 150 and back line sub-region 156; wherein life form card 260 is indicated to be in assault position by placing life form card 260 within front line sub-region 150; and wherein life form card 260 is indicated to be in armor position by placing life form card 260 within back line sub-region 156.

Figure 5:
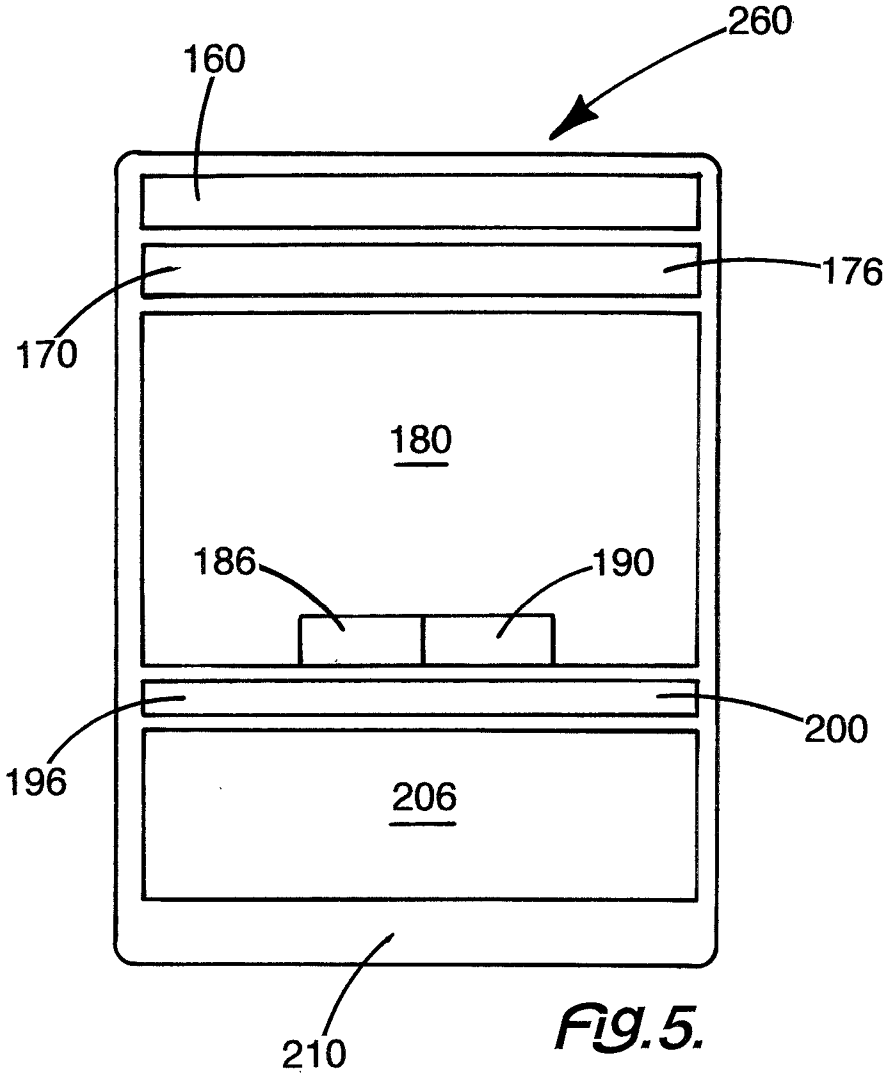
FIG. 5 depicts Life Forms Card 260 and its layout features.

FIG. 5 shows the playing face of life forms card 260, the opposing side being a back face 162. Life forms card 260 includes several information sections which include written or pictorial information related to the species of playing card depicted on life forms card 260. These information sections include specific information related to the categorization and characteristics of the specific life form being depicted. Life forms card 260 shown in FIG. 5 includes several information sections, including: card name 160; fuel cost 170; life form type 176; game card picture 180; life form assault power 186; life form armor power 190; card set 196; card number 200; card effect 206; and company information 210.

During gameplay, life forms card 260 is used primarily to confront an opponent's life forms. Life forms card 260 can also be used to assault an opponent's resources, thereby to depleting that player's resources points. The outcome of any confrontation between multiple life forms, or of any assault on a player's resources, is determined by the information found in life form assault power 186 and life form armor power 190 of the life forms card 260 involved in the confrontation.

Life forms cards 260 can be deployed in assault position or an armor position, as shown in FIGS. 3 and 4. The placement of a life form card 260 in the assault position or the armor position will dictate whether the information in life form assault power 186 or life form armor power 190 is used to determine the outcome of any confrontation involving the life form card 260. In one embodiment, life form card 260 is deployed in assault position by placing life form card 260 in vertical position 216 or within front line sub-region 150; wherein the outcome of any confrontation involving life form card 260 in assault position is determined by the information in life form assault power 186. In another embodiment, life form card 260 is deployed in armor position by placing life form card 260 in horizontal position 220 or within back line sub-region 156; wherein the outcome of any confrontation involving life form card 260 in armor position is determined by the information in life form armor power 190.

Figure 6:
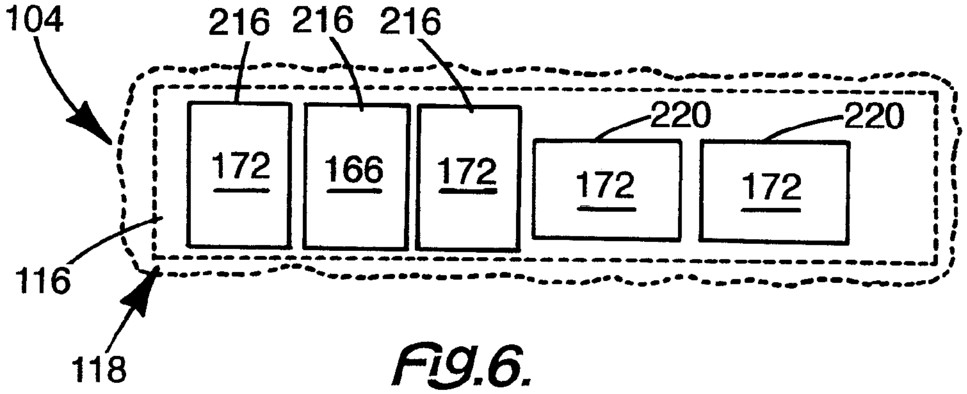
FIG. 6 depicts Fuel Depot First Layout 118 of Fuel Depot 116.
Figure 7:
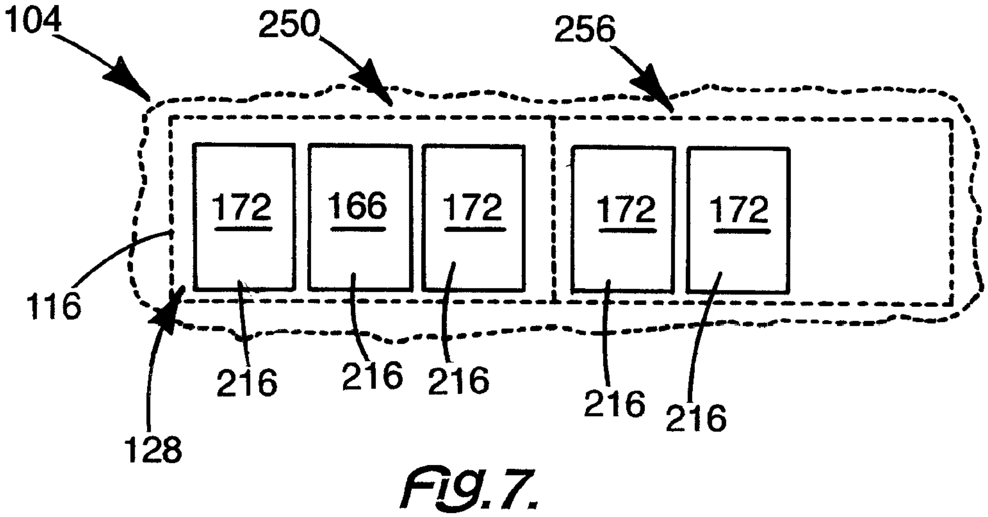
FIG. 7 depicts Fuel Depot Second Layout 128 of Fuel Depot 116, including Fuel Tank 250 and Depleted Fuel 256 sections.

FIGS. 1 and 2 show basic board 104 to include fuel depot 116. FIGS. 6 and 7 show a more detailed depiction of the layout of fuel depot 116 on basic board 104. FIG. 6 depicts fuel depot first layout 118; and FIG. 7 depicts fuel depot second layout 128. Fuel depot first layout 118 and fuel depot second layout 128 can be used interchangeably as the layout for fuel depot 116, depending on the preferences of individual players or game rules.

FIG. 6 shows fuel depot first layout 118 being populated by more than one designated fuel card 166 and fuel card 172. Designated fuel card 166 and fuel card 172 are shown in a vertical position 216 and a horizontal position 220. In one embodiment, placement of designated fuel card 166 or fuel card 172 in vertical position 216 indicates that the card is in an unused position for the purpose of gameplay. In another embodiment, placement of designated fuel card 166 or fuel card 172 in horizontal position 220 indicates that the card is in a used position for the purpose of gameplay. A player can transition designated fuel card 166 or fuel card 172 from an unused position to a used position by rotating the game card from vertical position 216 to horizontal position 220, and vice versa.

FIG. 7 shows fuel depot second layout 128 to include fuel tank sub-region 250 and depleted fuel sub-region 256. Fuel tank sub-region 250 and depleted fuel sub-region 256 are populated by more than one designated fuel card 166 and fuel card 172 in vertical position 216. In one embodiment, placement of designated fuel card 166 or fuel card 172 in fuel tank sub-region 250 indicates that the card is in an unused position for the purpose of gameplay. In another embodiment, placement of designated fuel card 166 or fuel card 172 in depleted fuel sub-region 256 indicates that the card is in a used position for the purpose of gameplay. A player can transition designated fuel card 166 or fuel card 172 from an unused position to a used position by transferring the game card from fuel tank sub-region 250 to depleted fuel sub-region 256, and vice versa.

Any combination of elements from fuel depot first layout 118 and fuel depot second layout 128 can be used for the layout of fuel depot 116 on basic board 104. In one embodiment, fuel depot 110 includes fuel tank sub-region 250 and depleted fuel line sub-region 256; wherein designated fuel card 166 or fuel card 172 is indicated to be in unused position by placing the game card in vertical position 216 within fuel tank sub-region 250; and wherein designated fuel card 166 or fuel card 172 is indicated to be in used position by placing the game card in horizontal position 220 within depleted fuel sub-region 256.

Figure 8:
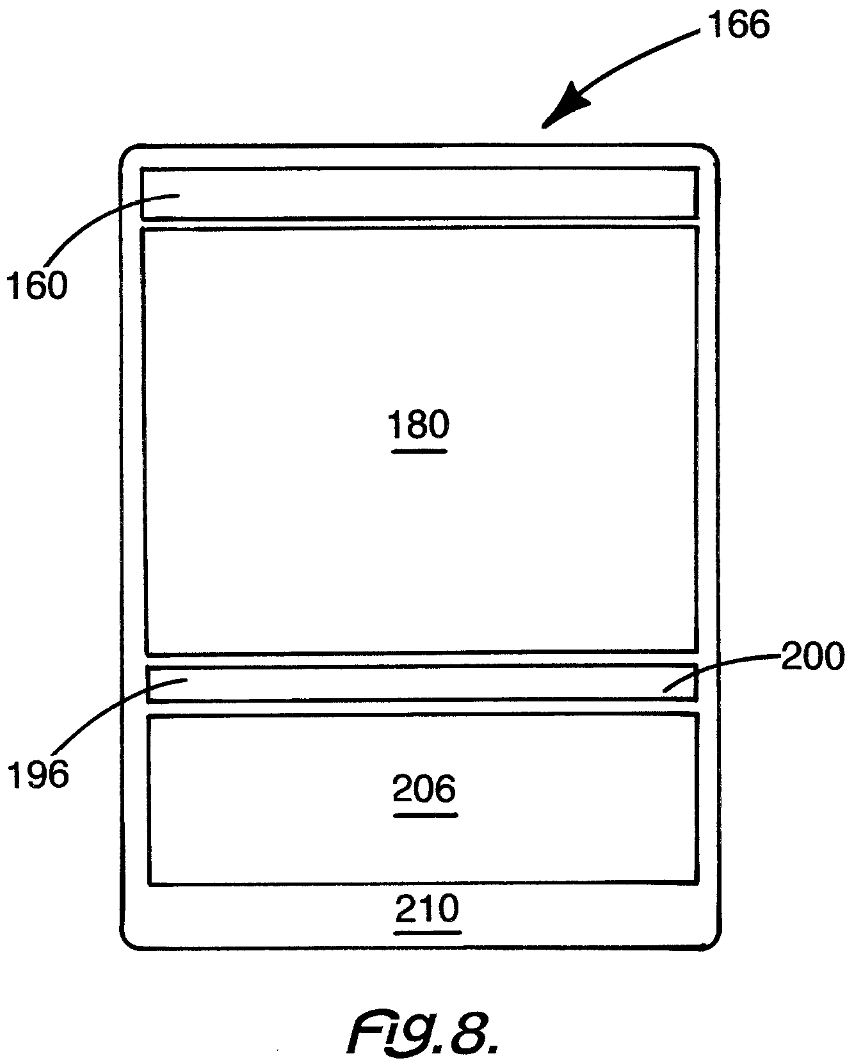
FIG. 8 depicts Designated Fuel Card 166 and its layout features.

FIG. 8 shows the playing face of designated fuel card 166, the opposing side being a back face 162 (as shown in FIG. 5). Designated fuel card 166 includes several information sections which include written or pictorial information related to the species of playing card depicted on fuel card 166. These information sections include specific information related to the categorization and characteristics of the specific fuel type being depicted. Fuel card 166 shown in FIG. 8 includes several information sections, including: card name 160; game card picture 180; card set 196; card number 200; card effect 206; and company information 210.

During gameplay, fuel cards are used to dictate the deployment and use of other game cards. Each designated fuel card 166 or fuel card 172 has a fuel value associated with that card. Fuel values from each designated fuel card 166 and fuel card 172 are combined to form a fuel pool. Other game cards, such as life form cards, have a fuel cost associated with the deployment of the game card or the use of card effects associated with the game card. Thus, all cards can be used as fuel, depending on the game circumstances. Such card flexibility is a unique feature of the game.

A player satisfies the fuel cost of a deployment or card effect by depleting a necessary amount of fuel value from the fuel pool. In one embodiment, a player depletes fuel value from that player's fuel pool by transitioning a necessary number of designated fuel card 166 and fuel card 172 from an unused position to a used position; including rotating the cards from vertical position 216 to horizontal position 220, or transferring the cards from fuel tank sub-region 250 to depleted fuel sub-region 256.

A player has the option of converting any game card into fuel card 172. A player converts a game card into fuel card 172 by deploying the game card in a manner which clearly indicates to all opponents that the game card is being used as fuel card 172. In one preferred embodiment, a player converts a game card into fuel card 172 by deploying the game card face-down in fuel depot 116, such that the playing face of the game card is hidden from view, and the back of the game card is face-up and viewable, thus showing the opposing side being as a back face 162 (as shown in FIG. 5).

Designated fuel card 166 is used similar to fuel card 172 for the purpose of gameplay, but can be deployed face-up in fuel depot 116. Designated fuel card 166 can have a card effect associated with the game card. In one embodiment, designated fuel card 166 has an associated card effect which can only be used once during each game. After the associated card effect is used, designated fuel card 166 is converted to fuel card 172 by inverting the game card from face-up to face-down in fuel depot 116. In another embodiment, designated fuel card 166 has an associated card effect which can be used repeatedly during each game. When the associated card effect is used, the designated fuel card 166 is transitioned from an unused position to a used position, but remains face-up.

FIGS. 1 and 2 show basic board 104 to include resource garrison 120. FIG. 2 shows resource garrison 120 being populated by more than one resource card 266.

Figure 9:
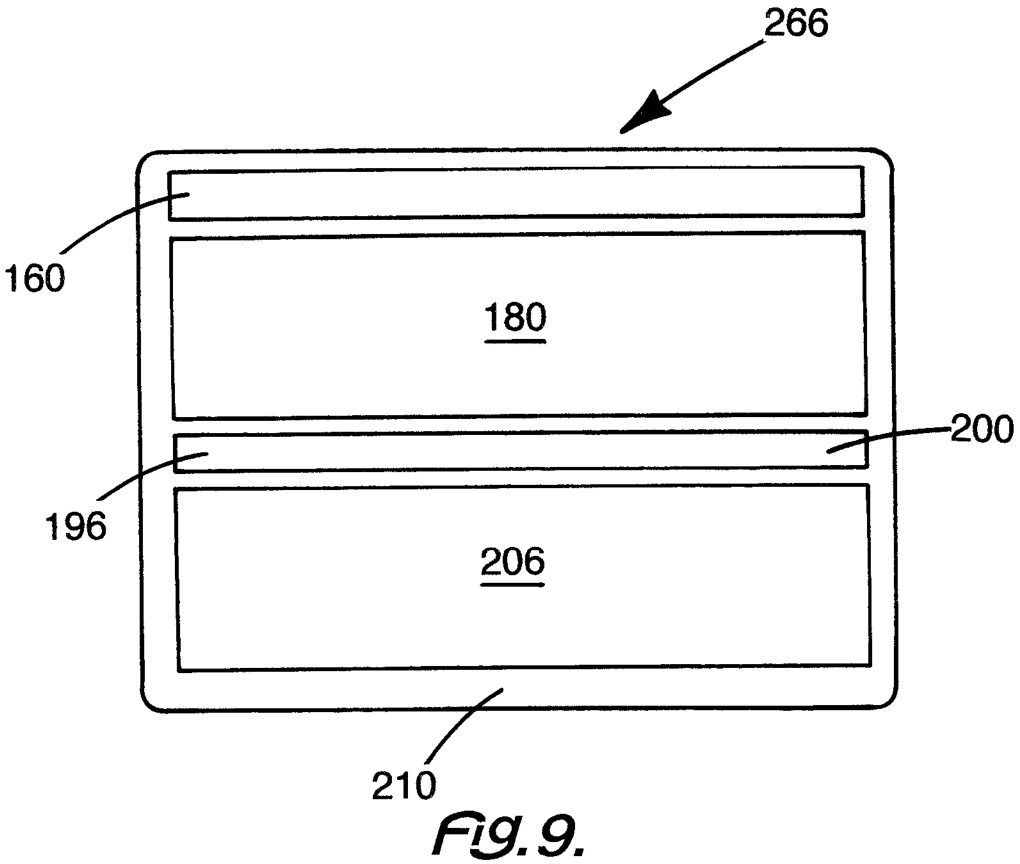
FIG. 9 depicts Resource Card 266 and its layout features.

FIG. 9 shows the playing face of resource card 266. Resource card 266 includes several information sections which include written or pictorial information related to the species of playing card depicted on resource card 266. These information sections specifically include information related to the categorization and characteristics of the specific resource type being depicted. Resource card 266 shown in FIG. 9 includes several information sections, including: card name 160; game card picture 180; card set 196; card number 200; card effect 206; and company information 210.

Each resource card 266 has a resource point value associated with the card. During gameplay, resource points play a role similar to life points in TCG and CCG games. A player begins a game with a defined number of resource points. These resource points are represented by a defined number of resource cards 266 in a player's resource garrison 120. In a preferred embodiment, all players start the game with 10 resource points, represented by 10 resource cards 266 in each resource garrison 120.

As gameplay progresses, events and confrontations can result in resource cards 266 being depleted from a player's resource garrison 120. When a resource card 266 is depleted, that card is removed from the player's resource garrison 120. The card is then placed in that player's stasis 136 to indicate depletion of the resource card 266 and loss of the related resource points. When all the resource cards 266 in a player's resource garrison 120 have been depleted, that player has exhausted all resource points and is defeated.

A player's resource points can be depleted through an assault by an opposing player's life forms. In specific circumstances, a first player's life form 260 can be used to assault an opposing second player's resources. The result is a depletion of the second player's resource cards 266 relative to the strength of the first player's assault. In one embodiment, the number of resource cards 266 in a player's resource garrison 120 is depleted by 1 card for each life form included in an assault by an opposing player. In another embodiment, the number of resource cards 266 in a player's resource garrison 120 is depleted by a number relative to the cumulative life form assault power 186 of all life forms included in an assault by an opposing player.

A player's resource points can also be depleted when that player activates a card effect associated with resource card 266. In one embodiment, resource card 266 has an associated card effect which can only be used once during each game. After the associated card effect is used by the player, resource card 266 is removed from the player's resource garrison 120. The card is then placed in that player's stasis 136 to indicate depletion of resource card 266 and loss of the related resource points.

The use of resource cards to represent a player's resource points eliminates the need for external scoring equipment (such as dice or score-sheets) to track the life point depletion for each player. The use of resource cards also improves the strategic complexity of the game. A player can gain a strategic advantage by activating the card effects associated with a resource card, but is also concurrently disadvantaged by the detrimental depletion of the resource points associated with the resource card.

FIGS. 1 and 2 show basic board 104 to include research facility 126. FIG. 2 shows research facility 126 being populated by tactical card 270.

Figure 10:
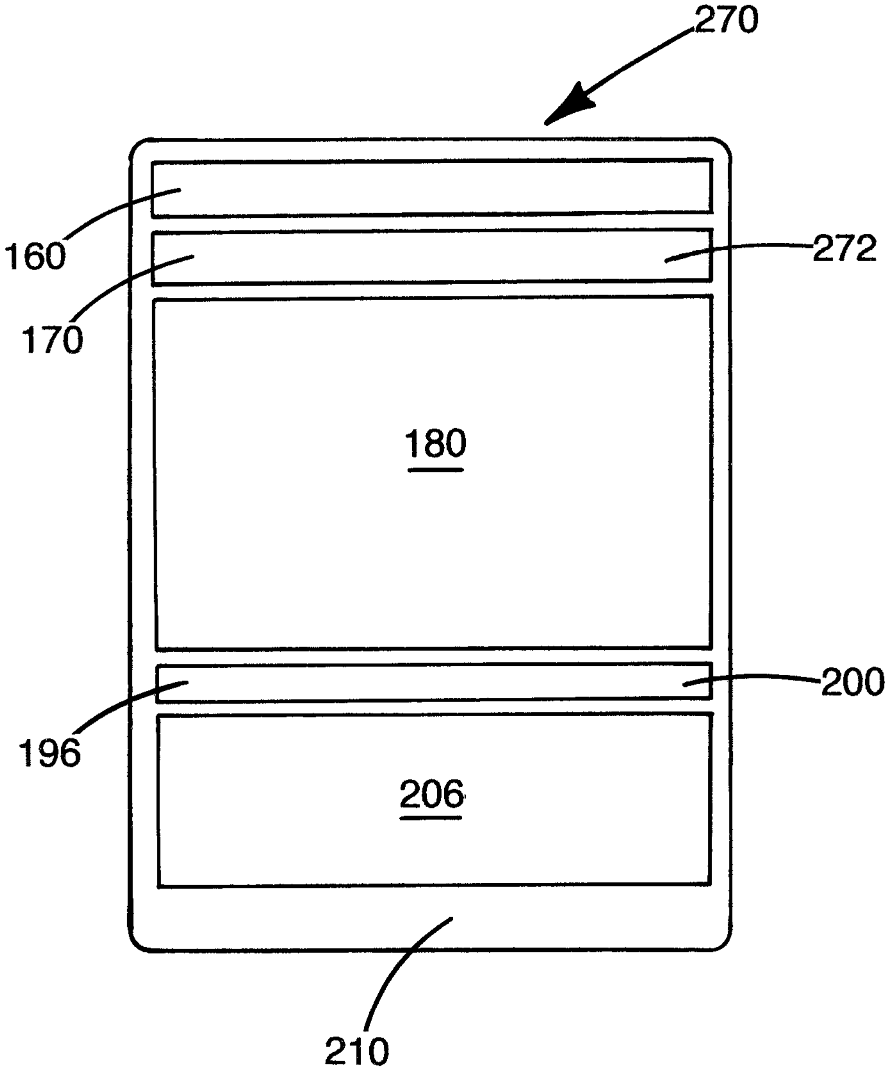
FIG. 10 depicts Tactical Card 270 and its layout features.

FIG. 10 shows the playing face of tactical card 270. Tactical card 270 includes several information sections which include written or pictorial information related to the species of playing card depicted on tactical card 270. These information sections specifically include information related to the categorization and characteristics of the specific tactical effect being depicted. Tactical card 270 shown in FIG. 10 includes several information sections, including: card name 160; fuel cost 170; tactical card type 272; game card picture 180; card set 196; card number 200; card effect 206; and company information 210.

Tactical cards 270 include card effects which are set forth in the card effects 206 section. These card effects can be used to alter the characteristics of game cards, to change the location or status of a card, or to alter the rules of the game. Tactical cards 270 can be categorized into sub-categories of tactical cards, with the specific sub-categorization information of a specific tactical card 270 being described in tactical card type 272 section of that tactical card. In one embodiment, tactical cards 270 are categorized into at least four sub-categories of tactical cards, including: Operation tactical cards, Rapid tactical cards, Enhancement tactical cards, and Perpetual tactical cards.

Operation tactical cards are tactical cards which have card effects that are resolved immediately after being activated. The card effects associated with operation tactical cards are typically used to temporarily alter the rules of the game. In one embodiment, an operation tactical card allows a player to immediately draw additional cards from the player's game deck 130 into the player's hand 122. The use of operation tactical cards is typically limited to specific phases of a player's turn. In one embodiment, operation tactical cards can only be played during the pre-ops phase and post-ops phase of a player's turn.

Rapid fire tactical cards are tactical cards which have card effects that are resolved immediately after being activated. The card effects associated with augmentation tactical cards are typically used in response to an opponent's gameplay choices. Rapid fire tactical cards can typically be used at any time during the game, including during an opponent's turn. In one embodiment, a rapid fire tactical card can be used during an opponent's turn to counteract the deployment of a game card by that opponent. In another embodiment, a rapid fire tactical card can be used during an opponent's turn to counteract the activation of a card effect of a game card by that opponent. In yet another embodiment, a rapid fire tactical card can be used during an opponent's turn to counteract a life form confrontation or resource assault initiated by that opponent.

Enhancement tactical cards are tactical cards which have card effects that can be attached to a target life form card. Typically enhancement tactical cards are used to alter the characteristics of one or more target life form cards. In one embodiment, an enhancement tactical card is can be used increase the life form assault power or the life form armor power of a target life form card. The use of enhancement tactical cards is typically limited to specific phases of a player's turn. In one embodiment, enhancement tactical cards can only be played during the pre-ops phase and post-ops phase of a player's turn.

The card effects associated with an enhancement tactical card can remain attached to the target life form card for a specific period of time, or perpetually. A card effect associated with an enhancement tactical card can also remain attached to the target life form card perpetually until the card effect is ended through game events. Game events which can end the card effect of an enhancement tactical card include: neutralization of the life form card to which the enhancement tactical card is attached; or activating a card effect on a game card which ends the effects of the enhancement tactical card.

Perpetual tactical cards are tactical cards which have card effects that are applied immediately after being activated, but which can remain in the game perpetually. A card effect associated with a perpetual tactical card typically remains active in the game until the card effect is ended through game events, such as a player activating a card effect on a game card which ends the effects of the perpetual tactical card. The use of perpetual tactical cards is typically limited to specific phases of a player's turn. In one embodiment, perpetual tactical cards can only be played during the pre-ops phase and post-ops phase of a player's turn.

Perpetual tactical cards can have card effects which affect a specific game card, a specific species of game card, a specific category or sub-category of game card, the entirety of game cards in a specific gameplay region, the entirety of game cards in a specific player region, or the entirety of game cards in the game as a whole. In one embodiment, a card effect associated with a perpetual tactical card can be used to alter the characteristics of one target life form card. In another embodiment, a card effect associated with a perpetual tactical card can be used to alter the characteristics of all life form cards within a specific category of life form cards. In yet another embodiment, a card effect associated with a perpetual tactical card can be used to alter the characteristics of all game cards within front line sub-region 150 to back line sub-region 156 of a player's battle field 110 region. In one embodiment, a card effect associated with a perpetual tactical card can be used to alter the rules of the game.

FIGS. 1 and 2 show basic board 104 to include game deck 130. FIG. 2 shows game deck 130 being populated by game cards. Before gameplay begins, a player selects a set number of game cards from that player's personal library to form a game deck. The game deck is shuffled or randomized, and then placed in game deck 130 region on basic board 104, with the game cards being face-down. During gameplay, game cards can be drawn from game deck 130 and placed into player's hand 122, or into other gameplay regions. In one embodiment, at least 50 game cards are included in each player's game deck.

FIG. 1 shows basic board 104 to include hand 122. During gameplay, game cards can be drawn from game deck 130 and placed into hand 122. Game cards in hand 122 remain until deployed into another gameplay region. Game cards from hand 122 can also be removed by being discarded into stasis 136. The number of cards allowed in hand 122 can be limited, or can be unlimited. In a preferred embodiment, game 100 includes no limits on the number of game cards which can be held in hand 122.

FIGS. 1 and 2 show basic board 104 to include stasis 136. FIG. 2 shows stasis 136 being populated by game cards. During gameplay, a player may remove from a gameplay region a specific game card which has been neutralized or depleted by a confrontation or game event, and then place that card in stasis 136 to indicated neutralization or depletion of that game card. Game cards can be placed face-up in stasis 136 to differentiate cards in stasis 136 from face-down cards in game deck 130.

Also included is a method of playing a variety Card Game involving two or more players, comprising: each player forming a game deck and placing the deck on a gameplay board; and each player taking turns of completing a series or collection of turn phases until one player is declared the winner. The series or collection of turn phases can include a player drawing, holding, and deploying a series of game cards from that player's card deck. The series or collection of turn phases can also include the player initiating in-game confrontations. In one embodiment, the series or collection of turn phases comprises: a Refuel phase, a Draw phase, a Pre-ops (pre-operational) phase, an Assault phase, a Post-ops (post-operational) phase, and an End phase.

A preferred embodiment of playing a variety Card Game is set forth. In one preferred embodiment, each player forms a game deck from that player's game card library, and places the game deck on a gameplay board. Gameplay begins by each player drawing 7 cards from his or her respective game decks into his or her hand. A player is chosen at random (such as a coin toss) to go first.

The player starts his or her turn with the refuel phase. During the refuel phase, the player returns all depleted fuel cards from the depleted fuel sub-region of the fuel depot region to the fuel tank sub-region of the fuel depot region. A player will not have any fuel cards to refuel on his or her first turn.

The player's turn then enters the draw phase. The player takes the top card from the face-down game deck and places that card in the player's hand.

The player's turn next enters the pre-ops phase. During this phase, the player can deploy cards from the player's hand into gameplay regions of the game board. A player may place any one card from his or her hand into the fuel tank sub-region of the fuel depot region. If the game card placed in the fuel tank is not a designated fuel card, the player places the game card face-down to indicate intent to use that card as a fuel card.

The player may also deploy life form cards from the player's hand into either the front line sub-region or the back line sub-region of the battle field region. Optionally, the player may place the cards in a horizontal position or a vertical position in another method of playing the game. The player must deplete a sufficient number of fuel cards to satisfy the fuel cost of the life forms being deployed. The player depletes the fuel cards by transferring the fuel cards from the fuel tank sub-region of the fuel depot region into the depleted fuel sub-region of the fuel depot region by changing the card position from horizontal to vertical. Card effects associated with tactical cards or resource cards can also be activated during the pre-ops phase.

The turn for the player then enters the assault phase. The first player skips his or her assault phase on his or her first turn. During the assault phase, a player may initiate a confrontation with an opponent's life forms, an assault on an opponent's resource cards, or a combination thereof. Life forms which are in assault position in the battle field region can be used in a life form confrontation or resource assault. Life forms which are in armor position cannot initiate a life form confrontation or resource assault.

When a player (player 1) initiates a life form confrontation between one of the assaulting life forms for player 1 and one of the defending life forms of an opposing player (player 2), the confrontation is resolved by comparing the assault power and armor power of the life forms engaged in the confrontation. If both life forms are in an assault position, then the life form with the higher assault power wins the confrontation. The losing life form is removed from that player's battle field region and placed in stasis. If both assault powers are equal, both life forms are sent to stasis.

If the defending life form is in an armor position, then the assault power of the assaulting life form and the armor power of the defending life form are compared. If the assaulting life form has an assault power greater than the armor power of the defending life form, then the defending life form is neutralized and is transferred to stasis. If the assaulting life form's assault power is equal to or less than the defending life form's armor power, both life forms survive and remain on the battle field in his or her current position.

Attacking life forms can also be combined to form joint assaults. In a joint assault, more than one life form may be designated to attack the same defending life form or life forms. In the joint assault, the assault power numbers of each attacking life form are combined to form a joint assault power number. The confrontation is resolved similar to a non-joint confrontation, with the assault power of a single life form being replaced with the joint assault power of the joint assault life forms. If the joint assault is initiated against defending life forms in assault position, then the defending player may distribute assault power damage from the defending life form onto the assaulting life forms as desired.

For example, if two assaulting life forms are selected for a joint assault, and both life forms have a 3 assault power, then the resulting joint assault power is 6. If the joint assault is assigned to confront a defending life form in assault position having a 4 assault power, then 6 assault damage is dealt to the defending life form having 4 assault power; so the defending life form is neutralized and sent to stasis. Furthermore, 4 assault damage from the defending life form is dealt to the two joint assault attacking life forms. The defending player may distribute 2 assault damage points to the first life form having 3 assault power, and then distribute the remaining 2 assault damage points to the second life form having 3 assault power. The result is both joint assault attacking life forms remaining alive and active. The defending player can also distribute all 4 assault damage points from the defending life form to the first life form having 3 assault power, wherein the first life form will be neutralized and sent to stasis, and the second life form will not be harmed.

A player may also initiate an assault on an opponent's resource cards. An assault on an opponent's resource cards can only be initiated if that opponent does not have any life forms on the battle field and cannot stop the assault by any other means (such as a tactical card). If the opponent fails to prevent the assault, then that player's resources are depleted by 1 resource card for every life form included in the assault. The opponent selects a sufficient number of resource cards to satisfy the resource depletion, and places those cards in stasis.

After the assault phase, the player enters his or her post-ops phase. The gameplay options and procedures for the post-ops phase are identical to those of the pre-ops phase. The player can deploy life forms, play tactical cards, deplete a resource, and set a fuel card (if they have not already done so in their pre-ops phase).

The player then ends his or her turn on the end phase. Gameplay then continues to the next player, who completes all phases of his or her turn. Gameplay continues until all players but one have been defeated. A player is defeated if all of that player's resource cards are depleted, or that player has no more cards in his or her game deck when they need to draw.

It is to be understood that the game cards can take different physical forms. For instance, in one version of the game, the game cards are hand-holdable cards. In another version of the game, the players interact with each other via a computer network, with the game cards visually displayed on the monitor. Play can also be accomplished between human players and an artificial intelligence player, such as a computer.

The variety card game disclosed herein can be played through the use of electronic media devices. In one embodiment, the variety card game is played through a consoled video game system, a computer, a video device, a hand-held video game system, or any related electronic media device. In another embodiment, the variety card game is played through a mobile device, an online network, an internet website, an online discussion forum, or any related electronic media device.

Also this game may have a provision for a Variety Card Game, which uses a combination of cards from more than one different Variety Card Games to engage in a combined Variety Card Game, there are many above embodiments of it. In one embodiment, the game includes: a) a first Variety Card Game comprising a pool of playing cards which are designed to implement a first construct of rules and gameplay; and b) a second Variety Card Game comprising a pool of playing cards which are designed to implement a second construct of rules and gameplay; wherein the first Variety Card Game and the second Variety Card Game are played together and integrated into a new third Variety Card Game having a third construct of rules and gameplay.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

What is claimed and sought to be protected by Letters Patent of the United States is:

1. A method for playing a card game for two or more players, comprising:

providing a playing surface, wherein the playing surface can be separated into one or more gameplay regions;

providing each of the two or more players with at least one game card, wherein each game card is associated with at least one gameplay characteristic;

having the at least one game card comprise at least one life point card and at least one life form card;

providing each player having a specific number of life form cards and a specific number of life point cards;

each of the life point cards being in either an active status or a depleted status;

completing a series of game events;

the series of game events including at least one game event which comprises placing at least one life form card on the playing surface to indicate inclusion of the life form card in the card game;

a joint assault being available by a combination of at least two life form cards by a first player on a single card of a second player;

the series of game events including at least one game event which converts at least one life form card from the active status to the depleted status or the neutralized status; and continuing to complete the series of game events until all of the life point cards for one or more of the players are in the depleted statue or sent to a stasis region.

2. The method of claim 1, further comprising the gameplay characteristic associated with at least one life form card comprising a card effect;

the first position being a vertical position when the second position is a horizontal position;

the first position being the horizontal position when the second Position is the vertical position;

the use of the card effect associated with the life form card resulting in at least one alteration to the series of game events, or resulting in at least one alteration to a gameplay characteristic associated with at least one game card; and the use of the card effect associated with the life point card resulting in the conversion of the life form card from the active status to the depleted status or neutralized status.

3. The method of claim 2, further comprising:

the at least one game card having a playing face and a back face;

the playing face providing a third card position;

the back face providing a fourth card position;

the playing face of the game card comprising gameplay information, wherein the gameplay information on the playing face of the game card describes the gameplay characteristics associated with the game card;

the game card being designated into at least one category of game cards;

wherein a game card can be designated into at least one category of game cards by indicating in the gameplay information on the playing face of the game card an intent to designate the game card into at least one category of game cards; and wherein a game card can be designated into at least one category of game cards by placing the game card on the playing surface in a gameplay region which is designated for the placement of the at least one category of game cards.

4. The method of claim 3 further comprising:

at least one game card being designated as a fuel card;

wherein a game card can be designated as a fuel card by indicating in the gameplay information on the playing face of the game card an intent to designate the game card as a fuel card;

wherein a game card can be designated as a fuel card by placing the game card on the playing surface in a gameplay region which is designated for the placement of fuel cards; and wherein a game card can be designated as a fuel card by placing the game card on the playing surface with the playing face directed face-down towards the playing surface and with the back face directed face-up away from the playing surface.

5. The method of claim 4 further comprising the series of game events including at least one game event which comprises at least one game card being designated as a fuel card by placing the game card on the playing surface with the playing face directed face-down towards the playing surface and with the back face directed face-up away from the playing surface.

6. The method of claim 5 further comprising:

each player having a fuel pool number;

the at least one fuel card having a fuel value associated therewith;

the at least one fuel card including a designated fuel card or a game card being placeable in a face down position from a face up position in a fuel depot region;

the designated fuel card having a higher fuel value effect or both associated therewith than the game card placed in the face down position;

the designated fuel card having a varying fuel value effect or both associated therewith based on a position of the fuel card;

the at least one fuel card being in either used status or unused status;

the series of game events including at least one game event which converts at least one fuel card from unused status to used status; and the conversion of the fuel card from unused status to used status resulting in an increase of the player's fuel pool number in an amount corresponding with the fuel value associated with the fuel card being converted from unused statue to used status.

7. The method of claim 6 further comprising:

at least one deployable game card having a deployment cost associated therewith;

the deployable game card being in either deployed status or non-deployed status;

the series of game events including at least one game event which converts at least one deployable game card from non-deployed status to deployed status;

the one or more regions being seven regions;

the seven regions including a hand region, a game deck region, the stasis region, a battle field region, a resource garrison region, the fuel depot region, and a research facility region;

the resource garrison region receiving cards face-up;

the designated fuel card having the position of the fuel card be the face up position, the face down position, the vertical position or the horizontal position;

the card having face-up being turned face-down as the game progresses;

a last player with at least one card in the face-up position in the resource garrison region being declared to be game winner;

each player having a separate playing surface and separate decks of cards; and the conversion of the deployable game card from non-deployed status to deployed status resulting in a decrease of the player's fuel pool number in an amount corresponding with the deployment cost associated with the deployable game card being converted from non-deployed status to deployed status.

8. The method of claim 3 further comprising:

at least one game card being designated as a life form card;

the at least one life form game card being in either assault status or armor status;

a first active status for the deployable game card being faceup;

a second active status with the deployable game card being vertical;

a first depleted status for the deployable game card being face down;

a second depleted status with the deployable game card being in the horizontal position; and the at least one life form game card having an assault power number, an armor power number, or both associated therewith.

9. The method of claim 8 further comprising:

the series of game events including at least one game event which comprises a first player initiating a confrontation event with a second player;

the confrontation event including a step wherein the first player selects at least one of the first player's life form cards as the assaulting life form card, and a step wherein the first player selects at least one of the second player's life form cards as the defending life form card;

the first depleted status card or the second depleted status card being in the stasis region;

the first active status card or the second active status card being in the garrison region; and the confrontation event being resolved by comparison of the assault power number of the assaulting life form cards with the assault power number of the defending life form cards when the defending life form cards are in assault status, or comparison of the assault power number of the assaulting life form cards with the defend power number of the defending life form cards when the defending life form cards are in armor status.

10. The method of claim 9 further comprising:

the joint assault being provided by a combination of at least two life form cards;

the active status being shown by a first position of the at least one life form card on the playing surface;

the depleted status being shown by a second position of the at least one life form card on the playing surface;

the first position being different than the second position;

at least two of the first player's life form cards being selected as the assaulting life form cards thereby providing the joint assault; and the assault power number used for the assaulting life form cards in the resolution of the confrontation event comprising a combination of the assault power numbers from the individual life form cards selected for inclusion as the assaulting life form cards; and the joint assault being provided by a total of the assault power number on each of the life form cards being combined and used by the first player as the assaulting life form card in the resolution of the confrontation event.

11. The method of claim 8 further comprising:

the series of game events including at least one game event which comprises a first player initiating an assault event with a second player;

the assault event including a step wherein the first player selects at least one of the first player's life form cards as the assaulting life form card;

the assault event resulting in the conversion of at least one of the second player's life form cards from the active status to the depleted status; and the number of the second player's life form cards requiring conversion from the active status to the depleted status corresponding with at least one of: a total number of life form cards selected by the first player as assaulting life form cards, a total assault power for the assaulting life form cards comprising a combination of the assault power numbers from the individual life form cards selected for inclusion as the assaulting life form cards, or combinations thereof.

12. The method of claim 1 further comprising:
the series of game events comprising a series of at least two players turns;
the player turns in the game comprising a series of turn phases;
the series of turn phases comprising: a refuel phase; a draw phase; at least one deployment stage; at least one operational stage for initiating confrontation events or assault events; and an end phase; and
the series of turn chases including at least one phase selected from the group consisting the refuel phase, the draw phase, a pre-operational deployment stage, an operational stage for initiating confrontation events or assault events, a post-operational deployment stage, and an end phase.

13. The method of claim 1, further comprising:
the card game being played through at least one electronic device comprising a consoled video game system, a computer, a video device, a hand-held video game system, a mobile device, an online network, an Internet website, an online discussion forum, or any other electronic media device;
wherein the playing surface comprises a display or surface visually depicted by the electronic device;
wherein the at least one game card comprises an image, icon or any other graphic depiction of a game card visually depicted by the electronic device; and
wherein the two or more players interact through direct or indirect electronic connection to complete the series of game events.

14. A card game for two or more players, comprising:
a playing surface, wherein the playing surface can be separated into one or more gameplay regions;
at least one game card, wherein each game card is associated with at least one gameplay characteristic, and wherein each player is provided with a specific number of game cards;
instructions for completing a series of game events;
the at least one game card comprising at least one life point card, wherein each player is provided with a specific number life point cards;
the life point card being in either the active status or the depleted status;
the at least one gameplay characteristic associated with at least one life point card comprising a card effect which can be used in a game event in the series of game events;
wherein the use of the card effect associated with the life point card results in at least one alteration to the series of game events, or resulting in at least one alteration to a gameplay characteristic associated with at least one game card;
wherein the use of the card effect associated with the life point card results in the conversion of the life point card from the active status to the depleted status;
the series of game events including at least one game event which comprises placing at least one game card on the playing surface to indicate inclusion of the placed game card in the card game;
the series of game events including at least one game event which converts at least one life point card from the active status to the depleted status; and
the series of game events continuing until all of the life point cards for one or more of the players are in the depleted status thereby leaving only one player with at least one life point card.

15. The card game of claim 14 further comprising:
the at least one game card comprising a playing face and a back face;
the playing face of the game card comprising gameplay information, wherein the gameplay information on the playing face of the game card describes the gameplay characteristics associated with the game card;
the at least one game card being designated into at least one category of game cards;
at least one game card being designated as a fuel card;
at least one game card being designated as a life form card;
wherein a game card can be designated into at least one category of game cards by indicating in the gameplay information on the playing face of the game card an intent to designate the game card into at least one category of game cards;
wherein a game card can be designated into at least one category of game cards by placing the game card on the playing surface in a gameplay region which is designated for the placement of the at least one category of game cards; and
wherein a game card can be designated as a fuel card by placing the game card on the playing surface with the playing face directed face-down towards the playing surface and with the back face directed face-up away from the playing surface.

16. The card game of claim 15 further comprising:
each player having a fuel pool number;
the at least one fuel card having a fuel value associated therewith;
the at least one fuel card being in either used status or unused status;
the series of game events including at least one game event which converts at least one fuel card from unused status to used status;
the conversion of the fuel card from unused status to used status resulting in an increase of the player's fuel pool number in an amount corresponding with the fuel value associated with the fuel card being converted from unused status to used status;
the at least one game card including at least one deployable game card having a deployment cost associated therewith;
the deployable game card being in either deployed status or non-deployed status;
the series of game events including at least one game event which converts at least one deployable game card from non-deployed status to deployed status; and
the conversion of the deployable game card from non-deployed status to deployed status resulting in a decrease of the player's fuel pool number in an amount corresponding with the deployment cost associated with the deployable game card being converted from non-deployed status to deployed status.

17. The card game of claim 16 further comprising:
the at least one life form game card being in either assault status or armor status;
the at least one life form game card having an assault power number, an armor power number, or both associated therewith;
the series of game events including at least one game event which comprises: a first player initiating a confrontation event with a second player, or a first player initiating an assault event with a second player;
the confrontation event including a step wherein the first player selects at least one of the first player's life form cards as the assaulting life form card, and a step wherein the first player selects at least one of the second player's life form cards as the defending life form card;
the confrontation event being resolved by comparison of the assault power number of the assaulting life form cards with the assault power number of the defending life form cards when the defending life form cards are in assault status, or comparison of the assault power number of the assaulting life form cards with the armor power number of the defending life form cards when the defending life form cards are in armor status;
the assault event including a step wherein the first player selects at least one of the first player's life form cards as the assaulting life form card;
the assault event resulting in the conversion of at least one of the second player's life point cards from the active status to the depleted Status;
the number of the second player's life point cards requiring Conversion from the active status to the depleted status corresponding with at least one of a total number of life form cards selected by the first player as assaulting life form cards, a total assault power for the assaulting life form cards comprising a combination of the assault power numbers from the individual life form cards selected for inclusion as the assaulting life form cards, or combinations thereof; and
a game winning player having at least one life point card in the active status.

18. The card game of claim 17 further comprising:
the series of game events comprising a series of at least two players turns;
the player turns comprising a series of turn phases;
the one or more regions being seven regions;
the seven regions including a hand region, a game deck region, a stasis region, a battle field region, a garrison region, a fuel depot region, and a research facility region;
the garrison region receiving a deck of resource cards;
the garrison region receiving some cards face-up;
the cards face-up being turned face-down as the game progresses;
a last player with at least one resource card face-up being declared a winner of a game;
each player having a separate playing surface and separate decks of cards;
the separate decks of cards including at least a fuel deck and the deck of resource cards;
the series of turn phases comprising: a refuel phase; a draw phase, a pre-operational deployment stage; an operational stage for initiating confrontation events or assault events; a post-operational deployment stage; and an end phase.

19. The card game of claim 18 further comprising:
the card game being played through at least one electronic device comprising a consoled video game system, a computer, a video device, a hand-held video game system, a mobile device, an online network, an internet website, an online discussion forum, or any other electronic media device;
wherein the playing surface comprises a display or surface visually depicted by the electronic device;
wherein the at least one game card comprises an image, icon or any other graphic depiction of a game card visually depicted by the electronic device; and
wherein the two or more players interact through direct or indirect electronic connection to complete the series of game events.

20. A card game for two or more players, comprising:
a playing surface, wherein the playing surface is separated into six or seven gameplay regions;
at least one game card for use in the card game, wherein each game card is associated with at least one gameplay characteristic and wherein each player of the two or more players is provided with a specific number of game cards;
each player of the two or more players having a specific number of life form cards and a specific number of life point cards;
each player of the two or more players instructions for completing a series of game events;
the at least one game card comprising at least one life point card, wherein each player is provided with a specific number life point cards;
the life point card being in either an active status or a depleted status; and
the at least one gameplay characteristic associated with at least one life point card comprising a card effect which can be used in a game event in the series of game events, wherein the use of the card effect associated with the life point card results in at least one alteration to the series of game events, or resulting in at least one alteration to a gameplay characteristic associated with at least one game card, and wherein the use of the card effect associated with the life point card results in the conversion of the life point card from the active status to the depleted statue;
the series of game events including at least one game event which comprises placing at least one game card on the playing surface to indicate inclusion of the placed game card in the card game;
the series of game events including at least one game event which converts at least one life point card from the active status to the depleted status;
the series of game events continuing to until all of the life point cards for one or more of the players are in depleted status;
at least one game card comprising a playing face and a back face;
the playing face of the game card comprising gameplay information, wherein the gameplay information on the playing face of the game card describes the gameplay characteristics associated with the game card;
the at least one game card being designated into at least one category of game cards;
at least one game card being designated as a fuel card;
at least one game card being designated as a life form card;
the active status being shown by a first position of the at least one game card on the playing surface;
the depleted status being shown by a second position of the at least one game card on the playing surface;
each of the life point cards being in either an active status or A depleted status;
a joint assault being provided by a combination of at least two life form cards;
the active status being shown by a first position of the at least one life form card on the playing surface;
the depleted status being shown by a second position of the at least one life form card on the playing surface;
the first position being different than the second position;
the first position being a vertical position when the second position is a horizontal position;
the first position being the horizontal position when the second position is the vertical position;
the playing face being a third card position;
the back face being a fourth card position;

wherein a game card can be designated into at least one category of game cards by indicating in the gameplay information on the playing face of the game card an intent to designate the game card into at least one category of game cards;

wherein a game card can be designated into at least one category of game cards by placing the game card on the playing surface in a gameplay region which is designated for the placement of the at least one category of game cards;

wherein a game card can be designated as a fuel card by placing the game card on the playing surface with the playing face directed face-down towards the playing surface and with the back face directed face-up away from the playing surface;

each player having a fuel pool number;

the at least one fuel card having a fuel value associated therewith;

the at least one fuel card being in either used status or unused status;

the series of game events including at least one game event which converts at least one fuel card from unused status to used status;

the conversion of the fuel card from unused status to used status resulting in an increase of the player's fuel pool number in an amount corresponding with the fuel value associated with the fuel card being converted from unused status to used status;

the at least one game card including at least one deployable game card having a deployment cost associated therewith;

the deployable game card being in either deployed status or non-deployed status;

the series of game events including at least one game event which converts at least one deployable game card from non-deployed status to deployed status;

the conversion of the deployable game card from non-deployed status to deployed status resulting in a decrease of the player's fuel pool number in an amount corresponding with the deployment cost associated with the deployable game card being converted from non-deployed status to deployed status;

the at least one life form game card being in either assault status or armor status;

the at least one life form game card having an assault power number, an armor power number, or both associated therewith;

the series of game events including at least one game event which comprises: a first player initiating a confrontation event with a second player, or a first player initiating an assault event with a second player;

the confrontation event including a step wherein the first player selects at least one of the first player's life form cards as the assaulting life form card, and a step wherein the first player selects at least one of the second player's life form cards as the defending life form card;

the confrontation event being resolved by comparison of the assault power number of the assaulting life form cards with the assault power number of the defending life form cards when the defending life form cards are in assault status, or comparison of the assault power number of the assaulting life form cards with the armor power number of the defending life form cards when the defending life form cards are in armor status;

the assault event including a step wherein the first player selects at least one of the first player's life form cards as the assaulting life form card;

the assault event resulting in the conversion of at least one of the second player's life point cards from the active status to the depleted status;

the number of the second player's life point cards requiring conversion from the active status to the depleted status corresponding with at least one of: a total number of life form cards selected by the first player as assaulting life form cards, a total assault power for the assaulting life form cards comprising a combination of the assault power numbers from the individual life form cards selected for inclusion as the assaulting life form cards, or combinations thereof;

the series of game events comprising a series of at least two players turns;

the player turns comprising a series of turn phases;

the six or seven regions including a hand region, a game deck region, a stasis region, a battle field region, a resource garrison region, a fuel depot region, and a research facility region;

the garrison region receiving cards face-up;

the cards face-up being turned face-down as the game progresses;

a last player with at least one card face-up being declared;

each player having a separate playing surface and separate decks of cards;

the series of turn phases comprising in order: a refuel phase, a draw phase, a pre-operational deployment stage; an operational stage for initiating confrontation events or assault events; a post-operational deployment stage; and an end phase;

the card game being playable on a set of individual game boards or through at least one electronic device comprising a consoled video game system, a computer, a video device, a hand-held video game system, a mobile device, an online network, an Internet website, an online discussion forum, or any other electronic media device;

wherein the playing surface comprises a display or surface visually depicted or displayed on the at least one electronic device;

wherein the at least one game card comprises an image, icon or any other graphic depiction of a game card visually depicted by the electronic device; and wherein the two or more players interact through direct or indirect electronic connection to complete the series of game events.

* * * * *